Jan. 28, 1930.    J. E. TIRPAK    1,745,197
VISOR FOR MOTOR VEHICLES
Filed Nov. 19, 1927

JOSEPH E. TIRPAK.
INVENTOR

BY
ATTORNEY

Patented Jan. 28, 1930

1,745,197

UNITED STATES PATENT OFFICE

JOSEPH E. TIRPAK, OF PASSAIC, NEW JERSEY

VISOR FOR MOTOR VEHICLES

Application filed November 19, 1927. Serial No. 234,387.

My invention relates to visors for motor or other vehicles.

With visors now commonly used on motor vehicles it is impossible to conveniently view traffic signals arranged at relatively great elevations while seated in natural driving position. With this objection in mind it is the principal object of my invention to provide a motor vehicle visor whereby unobstructed view of elevated signals may be had.

More specifically the invention provides a motor vehicle visor having a window and a shutter arranged to regulate the vision area through such window and which, in daylight driving, overlies the window to prevent the passage of sun rays therethrough.

With the preceding and other objects and advantages in mind, the invention consists in the novel combination of elements, constructions and arrangement of parts to be hereinafter specifically referred to, claimed and illustrated in the accompanying drawings, wherein:

Figure 1:
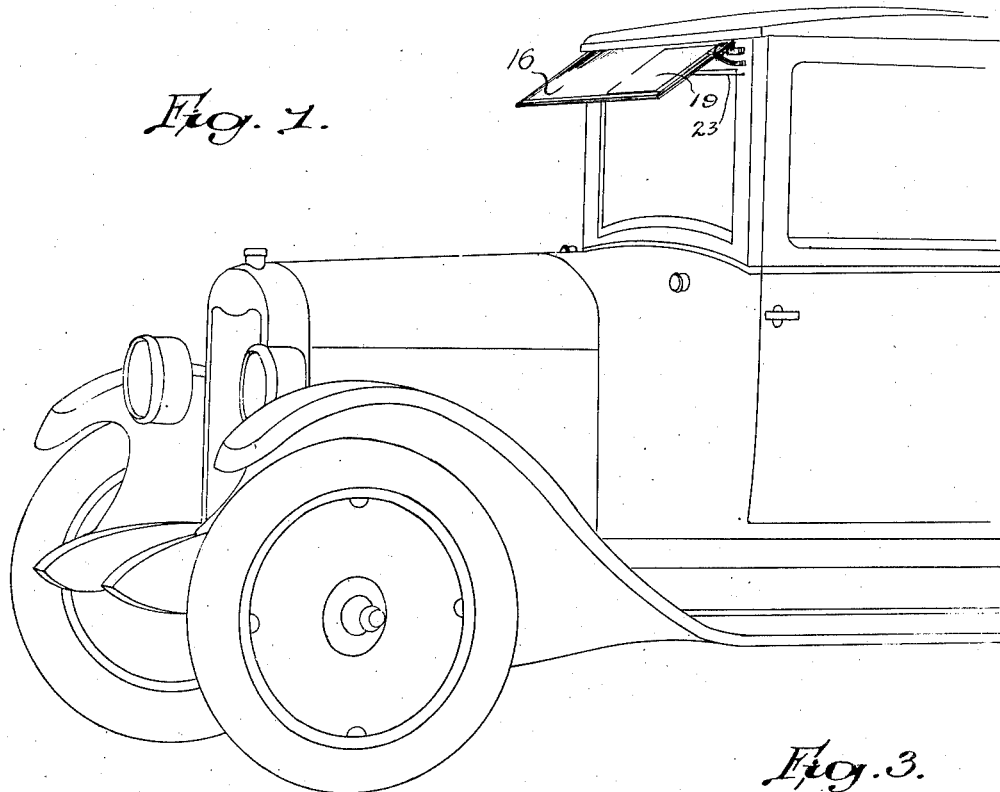
Figure 1 is a fragmentary perspective of a motor vehicle equipped with my invention.
Figure 3:
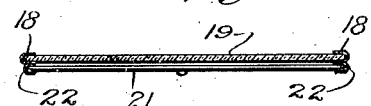
Figure 3 is a transverse section on line 3—3 of Figure 2.
Figure 2:
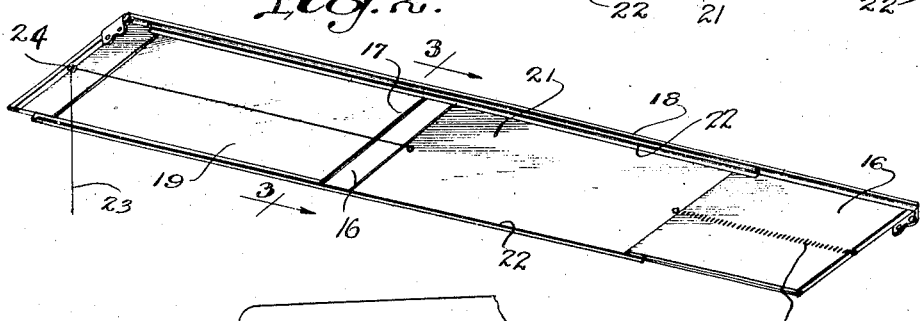
Figure 2 is a perspective of the visor removed from the motor vehicle.
Figure 4:
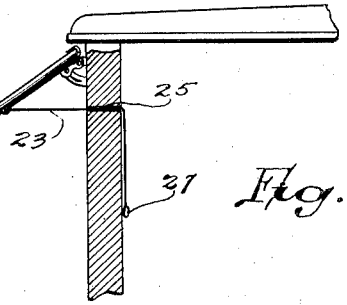
Figure 4 is a fragmentary view partly in side elevation and partly in vertical section of the device in use.

My improved visor includes a rectangular frame having parallel channel members 18 which receive the edges of the visor body or panel 16.

A transparent window pane 19 formed of glass or other transparent material is arranged in one end of the visor and has its longitudinal edges received and held in the channel shaped members 18.

To prevent the passage of light or sun rays through the window pane during daylight driving, a rectangular opaque shutter or slide 21, which is movable longitudinally of the visor in oppositely disposed channel shaped guides 22, which are welded or otherwise secured to the under face of the channel shaped members 18, is provided. An operating cord 23 is attached to the forward end of the shutter and extends through a ring or guide 24 at the forward end of the visor. This cord is extended laterally from the visor through an opening 25 in the vehicle frame where its inner end will be disposed within reach of the driver.

To normally return the shutter to a position to one side of the window pane, a contractile spring 26 attached to the rear end of the shutter and adjacent end of the visor, is provided.

It will be observed that by exerting a slight pull on the string the shutter will be drawn forwardly to overlie the window pane. With the shutter in this position the string is engaged with a suitable fastening 27 upon the interior of the motor vehicle to hold the shutter in advanced position against the contractile spring. Upon disengagement of the string from the fastening the shutter will be drawn rearwardly to one side of the window pane by the contractile spring. Any degree of vision may be obtained by advancing the shutter to a selected position and engaging the string with the fastening.

What is claimed is:—

1. In combination a vehicle visor having a window therein, guides extending longitudinally of the visor, a slide longitudinally adjustable in the guides, a contractile spring connected with one end of the slide and normally urging the latter in one direction, and a flexible element operatively connected with the opposite end of the slide whereby to advance the latter against the action of the contractile spring.

2. In combination a vehicle visor having a window therein, guides extending longitudinally of the visor, a slide longitudinally adjustable in the guides, a contractile spring connected with one end of the slide and normally urging the latter in one direction, and means operatively connected with the opposite end of the slide whereby to advance the latter against the action of the contractile spring.

Signed at Passaic in the county of Passaic and State of New Jersey this 17th day of November, A. D. 1927.

JOSEPH E. TIRPAK.